(12) United States Patent
Liao et al.

(10) Patent No.: US 11,383,502 B2
(45) Date of Patent: Jul. 12, 2022

(54) RECYCLABLE RETORT POUCH AND RECYCLABLE RETORT POLYESTER FILM THEREOF

(71) Applicant: NAN YA PLASTICS CORPORATION, Taipei (TW)

(72) Inventors: Te-Chao Liao, Taipei (TW); Wen-Cheng Yang, Taipei (TW); Ching-Yao Yuan, Taipei (TW); Chia-Yen Hsiao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 170 days.

(21) Appl. No.: 17/037,891

(22) Filed: Sep. 30, 2020

(65) Prior Publication Data

US 2021/0252845 A1 Aug. 19, 2021

(30) Foreign Application Priority Data

Feb. 19, 2020 (TW) .................................. 109105253

(51) Int. Cl.
*B32B 27/36* (2006.01)
*C08K 3/013* (2018.01)
(Continued)

(52) U.S. Cl.
CPC .............. *B32B 27/36* (2013.01); *B32B 27/08* (2013.01); *B32B 27/20* (2013.01); *B65D 65/40* (2013.01);
(Continued)

(58) Field of Classification Search
CPC ......... B32B 27/36; B32B 27/08; B32B 27/20; B32B 27/365; B32B 27/16; B32B 27/308; B32B 27/40; B32B 2250/03; B32B 2272/00; B32B 2307/70; B32B 2439/70; B32B 2439/06; B32B 2307/31; B32B 2307/75; B32B 2250/02; B32B 2250/24; B32B 2250/244; B32B 38/0008;
(Continued)

(56) References Cited

U.S. PATENT DOCUMENTS

2018/0346222 A1* 12/2018 Brumbaugh ............ B32B 27/32

FOREIGN PATENT DOCUMENTS

| CN | 1835994 B | 8/2010 |
|---|---|---|
| CN | 110452373 A | 11/2019 |

(Continued)

*Primary Examiner* — James C Yager
(74) *Attorney, Agent, or Firm* — Li & Cai Intellectual Property (USA) Office

(57) ABSTRACT

A recyclable retort pouch and a recyclable retort polyester film thereof are provided. The recyclable retort polyester film includes a heat seal layer and at least one polyester layer. The heat seal layer is composed of isophthalic acid, neopentyl glycol, polybutylene terephthalate, 1,4-cyclohexanedimethanol, and polyethylene terephthalate-1,4-cyclohexane dimethanol ester. The polyester layer is formed on the heat seal layer, and is composed of a polyester composition. The polyester composition includes a polyester resin made from recycled PET bottle flakes processed by physical or chemical methods and the polyester resin has an inherent viscosity between 0.62 dl/g and 1.0 dl/g. The recyclable retort pouch is made of the recyclable retort polyester film.

7 Claims, 3 Drawing Sheets

(51) Int. Cl.
*C08K 5/11* (2006.01)
*B65D 65/40* (2006.01)
*B32B 27/20* (2006.01)
*B32B 27/08* (2006.01)

(52) U.S. Cl.
CPC ............... *C08K 3/013* (2018.01); *C08K 5/11* (2013.01); *B32B 2307/31* (2013.01); *B32B 2307/75* (2013.01); *B32B 2439/06* (2013.01); *Y10T 428/1334* (2015.01); *Y10T 428/1352* (2015.01)

(58) Field of Classification Search
CPC ........ B65D 65/40; B65D 31/00; B65D 31/04; B65D 81/3415; C08J 5/18; C08J 2367/02; C08K 3/013; C08K 5/11; C08K 5/005; C08K 3/01; C08K 5/103; Y10T 428/1334; Y10T 428/1352
See application file for complete search history.

(56) References Cited

FOREIGN PATENT DOCUMENTS

| | | | |
|---|---|---|---|
| JP | 9503538 | A | 4/1997 |
| JP | 200320330 | A | 1/2003 |
| JP | 2012522069 | A | 9/2012 |
| JP | 2017209996 | A | 11/2017 |
| JP | 201834425 | A | 3/2018 |
| JP | 201938182 | A | 3/2019 |

* cited by examiner

F'

RECYCLABLE RETORT POUCH AND RECYCLABLE RETORT POLYESTER FILM THEREOF

CROSS-REFERENCE TO RELATED PATENT APPLICATION

This application claims the benefit of priority to Taiwan Patent Application No. 109105253, filed on Feb. 19, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a retort pouch, and more particularly to a recyclable retort pouch and a recyclable retort polyester film thereof.

BACKGROUND OF THE DISCLOSURE

The retort pouch, also known as "soft can", is a plastic film bag that can be heated, and has advantages of both steam-sterilization-resistant plastic bags and canned containers, so as to be an ideal packaging container. According to the sterilization level, retort pouches can be divided into three categories: (1) steam-sterilizing at 121° C. (for about 40 to 60 minutes); (2) steam-sterilizing at 135° C. (for about 20 minutes); (3) steam-sterilizing at 145° C. for a short time (for about 2 to 5 minutes).

In conventional technology, a common retort pouch that is a composite layered structure is composed of a surface layer, an intermediate layer, and a heat seal layer sequentially from the outside to the inside, and is formed by bonding different materials with adhesives. Among the layers, the material of the surface layer needs to have good support, heat resistance and printability; the shading, barrier and double-sided composite properties need to be considered for the material of the intermediate layer; and materials with heat resistance, chemical resistance, puncture resistance and low adsorption are selected as the material of the heat seal layer.

The conventional double-layer structure of retort pouches is polyethylene terephthalate (PET)/polyethylene (PE), PET/cast polypropylene (CPP) or biaxially oriented polyamide, (BOPA)/CPP. The conventional three-layer structure of retort pouches is PET/aluminum foil (AL)/CPP, BOPA/AL/CPP, PET/BOPA/CPP, and so on.

Since the retort pouch is made of multiple layers of different materials, the manufacturing process is very complicated. Improper selection of adhesives, improper dosage, laminating error of the composite roller, and insufficient pressure or temperature, may cause defects of the retort pouch, such as blistering, wrinkling, deformation, and so on. In addition, the composite film layer of the retort pouch is prone to delamination or breakage of the retort pouch after retorting, and is unable to be recycled and reused, thereby causing plastic pollution.

Therefore, how to simplify the preparation steps of the retort pouch, reduce the probability of breaking the retort pouch, and allow the retort pouch to be recyclable by improving the structure thereof, has become an important issue in this field.

SUMMARY OF THE DISCLOSURE

In response to the above-referenced technical inadequacies, the present disclosure provides a recyclable retort pouch and a recyclable retort polyester film thereof.

In one aspect, the present disclosure provides a recyclable retort polyester film including a heat seal layer and at least one polyester layer. The heat seal layer is composed of isophthalic acid, neopentyl glycol, polybutylene terephthalate, 1,4-cyclohexanedimethanol, and polyethylene terephthalate-1,4-cyclohexane dimethanol ester. The polyester layer is formed on the heat seal layer, and is composed of a polyester composition. In addition, the polyester composition includes a polyester resin, which is made from recycled PET bottle flakes processed by physical or chemical methods, and the polyester resin has an inherent viscosity between 0.62 dl/g and 1.0 dl/g. In certain embodiments, the polyester composition further includes an antioxidant component, a crystal nucleating agent and a flow promoter.

In certain embodiments, based on the total weight of the polyester composition, the recyclable retort polyester film includes 95 to 99 wt % of the polyester resin, 0.5 to 2 wt % of the antioxidant component, 0.5 to 2 wt % of the crystal nucleating agent, and 0.1 to 0.5 wt % of the flow promoter. In certain embodiments, the antioxidant component includes 50 to 60 wt % of a primary antioxidant and 40 to 50 wt % of a secondary antioxidant.

In certain embodiments, the recyclable retort polyester film further comprises a printed layer, which is formed on the polyester layer and is composed of hardener, and one or more than one of water-based polyester resin, water-based polyurethane resin, and water-based acrylic resin.

In another aspect, the present disclosure provides a recyclable retort pouch, which is made of the recyclable retort polyester film.

One of the advantages of the recyclable retort pouch and the recyclable retort polyester film thereof of the present disclosure is that, through the technical solutions of "the heat seal layer being composed of isophthalic acid, neopentyl glycol, polybutylene terephthalate, 1,4-cyclohexanedimethanol, and polyethylene terephthalate-1,4-cyclohexane dimethanol ester" and "a polyester layer being formed on the heat seal layer, and composed of a polyester composition; and the polyester composition including a polyester resin made from recycled PET bottle flakes processed by physical or chemical methods, and having an inherent viscosity between 0.62 dl/g and 1.0 dl/g", the material of the recyclable retort polyester film can be made of polyester material and has good heat sealability and heat resistance, does not require use of adhesives for bonding so as to avoid delamination, and is recyclable.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
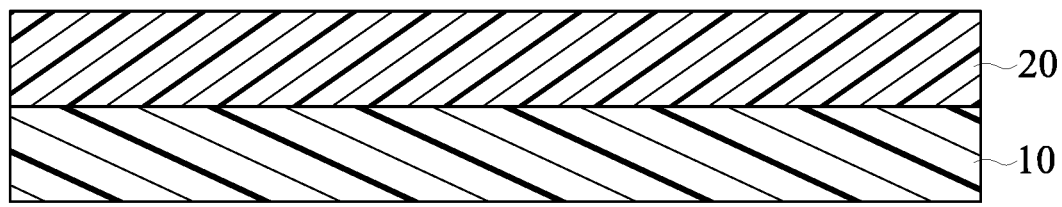
FIG. 1 is a cross-sectional view of one aspect of a recyclable retort polyester film according to a first embodiment of the present disclosure.

Since the commercial retort pouch is formed by bonding different materials through an adhesive, the commercial retort pouch has problems of complicated process, being unrecyclable and easily delaminated and broken. Therefore, the present disclosure provides a technical solution that uses a polyester material co-extruded multilayer film as a retort pouch film which does not require adhesive bonding, is easily processed and recyclable.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
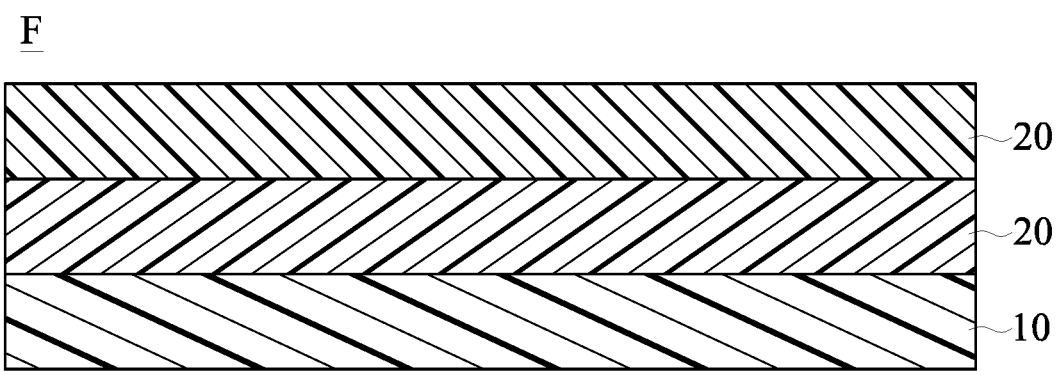
FIG. 2 is a cross-sectional view of another aspect of the recyclable retort polyester film according to the first embodiment of the present disclosure.

Referring to FIG. 1 and FIG. 2, a first embodiment of the present disclosure provides a recyclable retort polyester film F including a heat seal layer 10 and at least one polyester layer 20 which is formed on the heat seal layer 10. The heat seal layer 10 is composed of isophthalic acid, neopentyl glycol, polybutylene terephthalate, 1,4-cyclohexanedimethanol, and polyethylene terephtalate-1,4-cyclohexane dimethanol ester. Further, adding polyethylene terephthalate-1,4-cyclohexane dimethanol ester as the heat seal layer 10 can lower the melting point and achieve a good heat sealing effect. The polyester layer 20 can be one layer (as shown in FIG. 1), or two layers (as shown in FIG. 2) or multiple layers. The polyester layer 20 is composed of a polyester composition. The polyester composition includes a polyester resin, which is made from recycled PET bottle flakes processed by physical or chemical methods, and has an inherent viscosity between 0.62 dl/g and 1.0 dl/g. The polyester resin can include recycled polyester resin processed by physical method and recycled polyester resin processed by chemical method, and the recycled polyester resin processed by chemical method is more than or equal to 5 wt %.

Furthermore, the polyester resin can be formed of one or more than one types of dicarboxylic acid units and one or more than one types of diol units. Specific examples of dicarboxylic acid unit include isophthalic acid, terephthalic acid, phthalic acid, cyclohexane dicarboxylic acid, naphthalene dicarboxylic acid, or any combination thereof. Specific examples of diol unit include methylene glycol, 1,4-cyclohexanedimethanol, ethylene glycol, geminal ethylene glycol, propylene glycol, 1,2-propanediol, 1,3-propanediol, 2,2-propanediol, butanediol, 1,2-butanediol, 1,3-butanediol, 1,4-butanediol, 2,3-butanediol, 1,1-butanediol, 2,2-butanediol, isobutanediol, 1,2-isobutanediol, 1,3-isobutanediol, 1,1-isobutanediol, pentanediol, neopentyl glycol, 1,5-pentanediol, hexanediol, 2,3-dimethyl-2,3-butanediol, 2,5-dimethyl-2,5-hexanediol, diethylene glycol or any combination thereof.

In certain embodiments, the polyester resin can be polyester particles that have undergone solid-state polymerization treatment. The polyester resin can be selected from polyethylene terephthalate (PET), polytrimethylene terephthalate (PPT), polybutylene terephthalate (PBT), polyethylene naphthalate (PEN), polybutylene naphthalate (PBN), polycyclohexanedimethanol terephthalate (PCT), polycarbonate (PC) or polyarylate. The preferred polyester resin is PET, especially recycled PET bottle flakes. The inherent viscosity (IV) of the polyester resin can be between 0.62 deciliter/gram (dl/g) and 1.0 dl/g, and preferably between 0.65 dl/g and 0.75 dl/g. Therefore, the pressure of polyester resin (such as environmental pressure, external pressure, and so on) during molding can be reduced, and the heat generated by the shearing process can be reduced so as to avoid thermal decomposition of the polyester resin.

In this embodiment, the polyester composition of the polyester layer 20 includes 95 to 99 wt % of the polyester resin, 0.5 to 2 wt % of the antioxidant component, 0.5 to 2 wt % of the crystal nucleating agent, and 0.1 to 0.5 wt % of the flow promoter. It is worth mentioning that the formulation of the polyester composition can improve the crystal orientation of the biaxially stretched film.

The antioxidant component includes 50 to 60 wt % of a primary antioxidant and 40 to 50 wt % of a secondary antioxidant. It is worth mentioning that the primary antioxidant and the secondary antioxidant can exert a synergistic effect to provide better antioxidant effects. Specifically speaking, the primary antioxidant can quickly react with peroxy radicals (ROO.) to stop the chain reaction of free radicals, and the secondary antioxidant can react with hydroperoxide (ROOH) to convert it into a radical-free and non-reactive product. The primary antioxidant can be selected from phenolic compounds or amine compounds, and specific examples include commercially available products under the trade names Irganox 1010, Irganox 1425, Irganox 245, Anox 1315, Anox PP18, Anox 20, Lowinox 1790, Lowinox TBM-68 and Naugard 445. The secondary antioxidant can be selected from phosphorous compounds or thioester compounds, and specific examples include commercially available products under the trade names of Sandostab P-EPQ, Irgafos 168 and Naugard 412S.

The crystal nucleating agent can improve the heat resistance of the polyester film. In addition, the crystal nucleating agent can promote crystal growth and miniaturize the crystal size. The crystal nucleating agent can be mineral materials, metal oxides, silicon compounds, metal salts of organic or inorganic acids, aromatic phosphate metal salts, polyol derivatives, sulfonamide compounds, glass powder, metal powder, or any combination thereof. Specific examples of the mineral materials include graphite, talc and kaolin. Specific examples of the metal oxides include zinc oxide, aluminum oxide, and magnesium oxide. Specific examples of the silicon compounds include silicon oxide, calcium silicate and magnesium silicate. Specific examples of the metal salts of organic or inorganic acids include metal carbonates such as magnesium carbonate, calcium carbonate, sodium carbonate, and potassium carbonate, barium sulfate, calcium sulfate, sodium benzoate, and aluminum p-tert-butyl benzoate. The phosphate metal salts include aromatic phosphate metal salts. Specific examples of the polyol derivatives include dibenzylidene sorbitol. Considering heat resistance, the preferred crystal nucleating agent is an inorganic material. The flow promoter can improve the transparency and surface gloss of the polyester film. The flow promoter can be pentaerythritol stearate (PETS) or its analogs, while at high temperatures, has good thermal stability, low volatility, good mold release and flow properties, and has a good nucleation effect on partially crystalline polyester.

Second Embodiment

Figure 3:
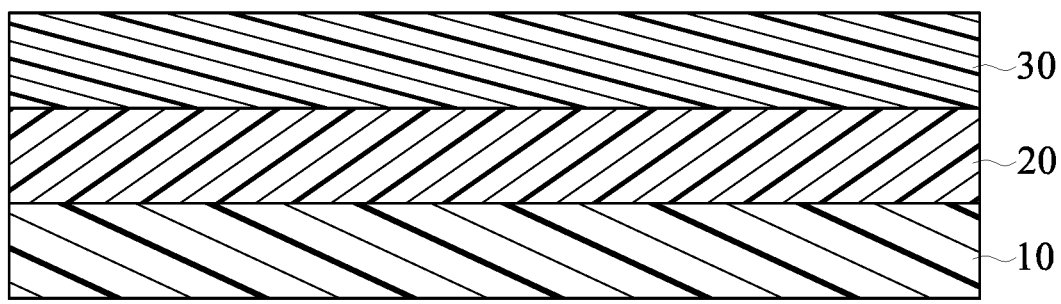
FIG. 3 is a cross-sectional view of a recyclable retort polyester film according to a second embodiment of the present disclosure.

Referring to FIG. 3, a second embodiment of the present disclosure provides a recyclable retort polyester film F' including a heat seal layer 10, at least one polyester layer 20, and a printed layer 30. In this embodiment, the quantity of the polyester layer 20 is one, and the polyester layer 20 is formed on the heat seal layer 10. The printed layer 30 is formed on the polyester layer 20 and is composed of one or more than one of water-based polyester resin, water-based polyurethane resin, and water-based acrylic resin, and hardener. In addition, the materials of the heat seal layer 10 and the polyester layer 20 are the same as those described in the first embodiment of the present disclosure, and will not be reiterated herein.

Further, the printed layer 30 has a corona-treated surface to achieve the effect of easy ink bonding and good printing quality.

The specific preparation method of the recyclable retort polyester film can be adding the masterbatches of the heat seal layer and the polyester layer (and the printed layer) that have undergone solid-state polymerization to different twin-screw extruders and adjusting the temperature of the extruder until the masterbatches melts. For instance, the masterbatches can include polyester components, antioxidant components, crystal nucleating agents, flow promoters, and so on, which are obtained after kneading, esterification, melting, cooling, and granulation. After being melted and filtered, the masterbatches are made into a laminate sheet by co-extruding a multilayer film, and then undergoes a horizontal stretching process and a vertical stretching process so as to form a recyclable retort polyester film. However, these details are only one of feasible implementations provided by this embodiment and are not intended to limit the present disclosure.

The present disclosure further provides a recyclable retort pouch, which is made of the recyclable retort polyester film of the present disclosure, and the recyclable retort pouch can be used for food packaging.

Heat Penetration Test

The recyclable retort pouch made of recyclable retort polyester film is resistant to steam-sterilizing. After boiling in water (or steaming) at 121° C. for 30 minutes, or boiling in water at 135° C. for 15 minutes, the surface of the recyclable retort pouch is not deformed, not wrinkled, and no delamination occurs between layers thereof.

Advantages of the Embodiments

One of the advantages of the recyclable retort pouch and the recyclable retort polyester film thereof of the present disclosure is that, through the technical solutions of "the heat seal layer being composed of isophthalic acid, neopentyl glycol, polybutylene terephthalate, 1,4-cyclohexanedimethanol, and polyethylene terephthalate-1,4-cyclohexane dimethanol ester" and "a polyester layer being formed on the heat seal layer, and composed of a polyester composition; and the polyester composition including a polyester resin made from recycled PET bottle flakes processed by physical or chemical methods, and having an inherent viscosity between 0.62 dl/g and 1.0 dl/g", the material of the recyclable retort polyester film can be made of polyester material and has good heat sealability and heat resistance, does not require use of adhesives for bonding so as to avoid delamination, and is recyclable.

Further, the recyclable retort polyester film of the present invention uses polyethylene terephthalate-1,4-cyclo-hexanedimethanol instead of CPP as a heat seal layer, which has good thermal stability, water retort resistance and heat sealability, so that the heat seal strength of heat seal layer is equivalent to CPP when heat-sealed at 180° C. The polyester layer has an inherent viscosity between 0.62 dl/g and 0.80 dl/g, which can effectively bond the heat seal layer without the use of adhesives, and the heat seal layer does not easily delaminate, which can simplify the production process. In addition, the surface of the printed layer is corona treated, which can effectively increase the coloring effect of printing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A recyclable retort polyester film, comprising:
   a heat seal layer including isophthalic acid, neopentyl glycol, polybutylene terephthalate, 1,4-cyclohexanedimethanol, and polyethylene terephthalate-1,4-cyclohexane dimethanol ester; and
   at least one polyester layer formed on the heat seal layer, wherein the polyester layer includes a polyester composition;

wherein the polyester composition includes a polyester resin made from recycled PET bottle flakes and being processed by physical or chemical methods, and wherein the polyester resin has an inherent viscosity between 0.62 dl/g and 1.0 dl/g.

2. The recyclable retort polyester film according to claim 1, wherein the polyester composition further includes an antioxidant component, a crystal nucleating agent and a flow promoter.

3. The recyclable retort polyester film according to claim 2, wherein based on the total weight of the polyester composition, the recyclable retort polyester film includes 95 to 99 wt % of the polyester resin, 0.5 to 2 wt % of the antioxidant component, 0.5 to 2 wt % of the crystal nucleating agent, and 0.1 to 0.5 wt % of the flow promoter.

4. The recyclable retort polyester film according to claim 3, wherein the antioxidant component includes 50 to 60 wt % of a primary antioxidant and 40 to 50 wt % of a secondary antioxidant.

5. The recyclable retort polyester film according to claim 1, the recyclable retort polyester film further comprising:
a printed layer being formed on the polyester layer and including a hardener, and one or more of water-based polyester resin, water-based polyurethane resin, and water-based acrylic resin.

6. The recyclable retort polyester film according to claim 5, wherein the printed layer has a corona-treated surface.

7. A recyclable retort pouch, which is made of the recyclable retort polyester film as claimed in claim 1.

* * * * *